United States Patent [19]
Smolenski

[11] Patent Number: 6,058,140
[45] Date of Patent: *May 2, 2000

[54] METHOD AND APPARATUS FOR INVERSE 3:2 PULLDOWN DETECTION USING MOTION ESTIMATION INFORMATION

[75] Inventor: Michael J. Smolenski, Mountain View, Calif.

[73] Assignees: Zapex Technologies, Inc., Mountain View, Calif.; Nippon Steel Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/526,064

[22] Filed: Sep. 8, 1995

[51] Int. Cl.[7] .............................. H04B 1/66; H04N 7/01; H04N 5/14; H04N 9/64
[52] U.S. Cl. ........................ 375/240; 348/452; 348/558; 348/699; 348/700
[58] Field of Search .................................. 348/700, 699, 348/448, 441, 446, 451, 452, 416, 415, 558, 459, 443, 96

[56] References Cited

U.S. PATENT DOCUMENTS

| | | | |
|---|---|---|---|
| 4,876,596 | 10/1989 | Faroudja | 348/441 |
| 4,982,280 | 1/1991 | Lyon et al. | 348/441 |
| 5,255,091 | 10/1993 | Lyon et al. | 348/443 |
| 5,317,398 | 5/1994 | Casavant et al. | 348/570 |
| 5,398,071 | 3/1995 | Gove et al. | 348/558 |
| 5,426,464 | 6/1995 | Casavant et al. | 348/415 |
| 5,452,011 | 9/1995 | Martin et al. | 348/526 |
| 5,491,516 | 2/1996 | Casavant et al. | 348/415 |
| 5,508,750 | 4/1996 | Hewlett et al. | 348/558 |
| 5,550,592 | 8/1996 | Markandey et al. | 348/448 |
| 5,835,672 | 11/1998 | Yagasaki et al. | 386/111 |

*Primary Examiner*—Vu Le
*Attorney, Agent, or Firm*—Blakely, Sokoloff, Taylor & Zafman LLP

[57] ABSTRACT

Converting 24 frame per second film source material to 60 fields per second video involves converting one film frame into either two or three video fields using a repeating 3:2 field pattern, referred to as a 3:2 pulldown. When one film frame is made into three video fields, there will be a redundant video field. Once the source material has been transferred to video, the video is edited and distributed. When compressing video that was originally film source, the presence of the duplicate fields results in sub optimal compression. The highest efficiency compression can be achieved when the redundant fields are skipped and the frame rate is returned to that of the original film source. Thus, an inverse 3:2 pulldown, is necessary to identify and remove the redundant video fields before the video is compressed. To identify the redundant video fields, a method and apparatus is disclosed that generates motion vectors and error displacements for adjacent video fields. The motion vectors and error displacements are analyzed and a determination is made whether the video fields are redundant.

10 Claims, 8 Drawing Sheets

FIG. 1 (PRIOR ART) TYPICAL CONVERSION FROM FILM TO NTSC VIDEO

CONVERSION FROM NTSC VIDEO FROM A FILM SOURCE
TO DIGITAL VIDEO, WITH REDUNDANT FIELDS REMOVED

METHOD AND APPARATUS FOR INVERSE 3:2 PULLDOWN DETECTION USING MOTION ESTIMATION INFORMATION

FIELD OF THE INVENTION

This invention relates to the field of digital compression technology. Specifically, the present invention discloses a method and apparatus for using motion estimation information to identify redundant video fields before compression.

BACKGROUND OF THE INVENTION

Many television programs are originally shot with film. For National Television Standards Committee (NTSC) video distribution, the film source material (at 24 frames/s) is converted to video medium (at 60 fields/s) before editing. The most common method of converting film source material to NTSC video medium involves converting one film frame into either two or three video fields using a repeating 3:2 field pattern, referred to as a 3:2 pulldown, as shown in FIG. 1. One film frame on an input device, typically a film gate, is transferred to two video fields on an output device. The next film frame on the input device is then transferred to the next successive three video fields, the first and the third field being duplicates. The third input film frame is transferred to the successive two video fields on the output device and so on. Thus, a single film frame may correspond to either two or three successive video fields. The redundant video field may cause slight "motion artifacts" when the video is played back. Fortunately, the effect of this is minimal and the additional fields do not appreciably affect the smoothness of the material for most viewers. Once the source material has been transferred to video, the video material is edited, then distributed. Editing the video material affects the 3:2 pattern, making it difficult to return the video to its original source material frame rate.

The additional video fields do, however, present a problem in other instances. Recent developments in digital compression technology have enabled conversion, storage, and transmission of this video material in the digital domain. In order to allow video to be delivered over existing computer and telecommunications networks, video sources have to be converted to an optimal format for compression. When compressing video that was originally film source, the presence of duplicate fields results in sub optimal compression. Duplicate video fields are compressed, thus reducing the efficiency of the compression. The highest efficiency compression can be achieved when the redundant information is skipped and the frame rate is returned to that of the original film source.

The ideal solution may seem to be a film-to-compressed video conversion apparatus that can avoid all the problems associated with returning the material to its original frame rate. This solution presents a number of problems however. First, no such apparatus has yet been created. Additionally, editing is best done before compression, so this solution would require film editing that is much more expensive than video editing. Finally, the film and video industries have already invested large amounts of money into film-to-video conversion equipment and video editing equipment. Thus, an optimal solution for returning the video material to the source material frame rate before compression will require a reverse of the 3:2 pulldown process described above. This conversion, hereafter referred to as inverse 3:2 pulldown, is shown in FIG. 2.

No practical conversion methods currently exist in the industry to perform the inverse 3:2 pulldown and return the video frame rate to its original source rate for optimal compression. Methods exist to detect video signals containing images that have been converted from film source. For example, U.S. Pat. No. 5,317,398 uses circuitry for generating pixel value differences in successive frames of the video signal. The differences are then accumulated and input to a correlation circuit. Average values, known as correlation values, are also computed and subtracted from the output of the correlation circuit. The video signal is determined to have been created from film source if the difference values are greater than a predetermined threshold value. This method does not, however, generate an output of what the 3:2 pulldown cycle is during a respective frame interval of the video signal. This 3:2 pulldown cycle is crucial in inverse frame rate conversion to the original film rate without creating annoying stutter in any motion of the video. These methods thus do not provide the required information for restoring the original film frame rate.

SUMMARY OF THE INVENTION

It is therefore an object of the present invention to improve digital compression of film and video source material by identifying redundant fields for removal before the source is compressed. Specifically, it is an object of the present invention to provide near real-time automatic inverse 3:2 pulldown detection using motion estimation information.

The present invention introduces the concept of determining redundant fields based on a combination of the magnitude and correlation between motion vectors of respective blocks in adjacent fields. Once the redundant fields are identified based on the present invention, they may be removed before the film or video is compressed, thus increasing the efficiency of the compression.

Other objects, features and advantages of the present invention will be apparent from the accompanying drawings, and from the detailed description.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

The present invention provides a method of near real-time automatic inverse 3:2 pulldown detection using motion estimation information. In the following description, for purposes of explanation, specific nomenclature is set forth to provide a thorough understanding of the present invention. It will, however, be apparent to one skilled in the art that these specific details are not required to practice the present invention. For example, the present invention will be described with reference to one specific digital video compression standard, namely the International Standards Organization (ISO) Motion Pictures Experts Group's (MPEG) MPEG-2 standard. The older MPEG-1 standard was optimized for noninterlaced (progressive) video only. The MPEG-2 standard is intended to support progressive video as well as current television scanning patterns that use an interlaced video format. Interlaced video frames consist of two consecutive video fields (odd and even fields) where each video field defines every other line of a video frame. The teachings of the present invention are not limited to MPEG-2 systems, however, and can be used in other systems that generate motion vectors.

MPEG-2 uses a motion compensation prediction technique that takes advantage of the temporal redundancy within video signals. This technique operates by using motion vectors to predict motion from one video frame to the next video frame in the temporal direction, then taking advantage of the prediction output to increase compression rates. Video frames are divided into sub areas or "macroblocks," and the macroblocks are then used for motion estimation. Motion vectors are two-dimensional vectors that provide an offset from the macroblock position in the current frame to the macroblock position in a reference frame (either a previous or a future frame). Motion estimation is the process of estimating motion vectors during the encoding process. The output of motion compensation prediction is a spatial block data that is then processed using a discrete cosine transform (DCT). The DCT removes spatial correlation before the spatial block data is quantized and less important information is discarded. Finally, the motion vectors are combined with the DCT information and encoded using variable length codes.

Figure 1:
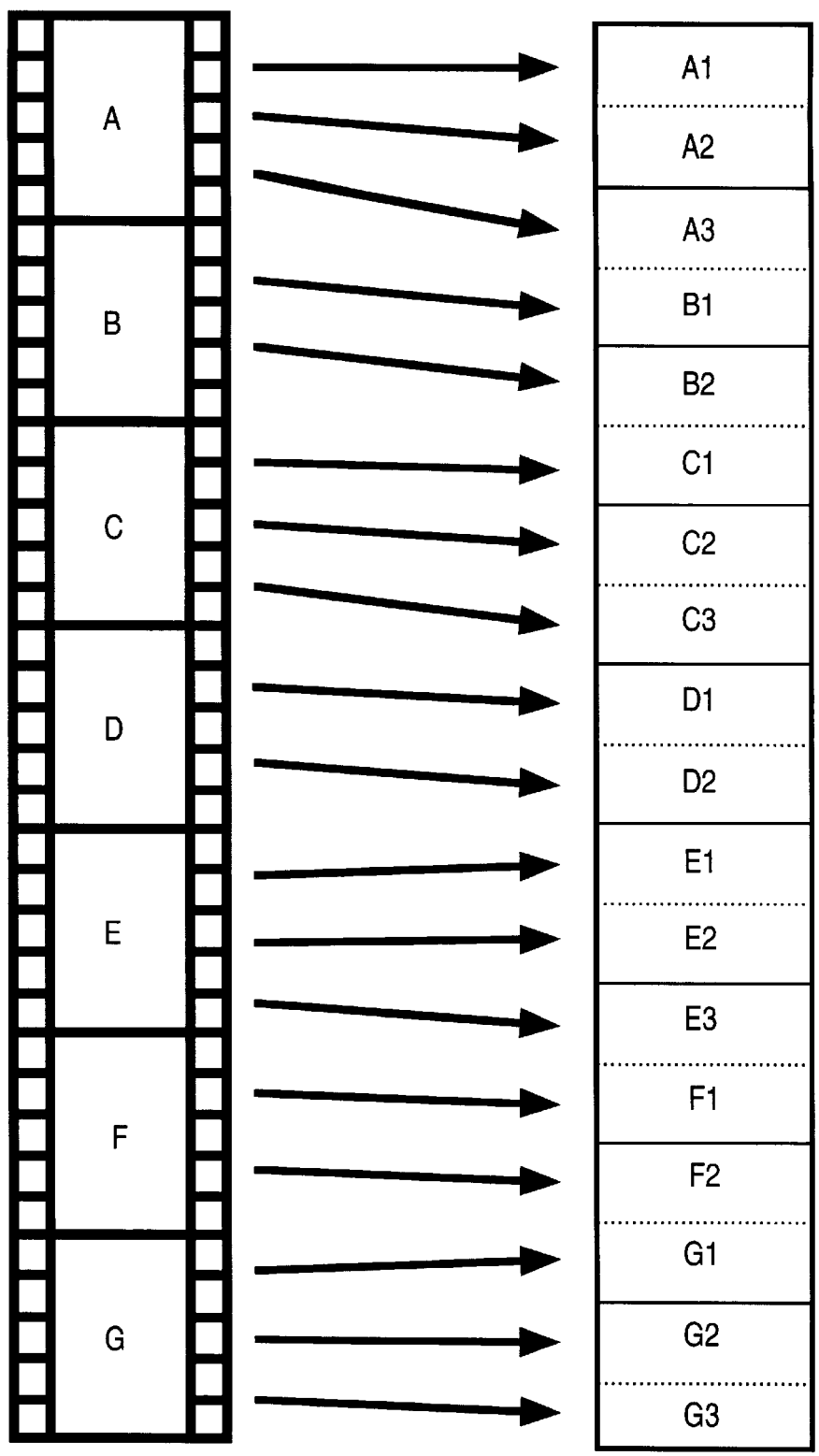
FIG. 1 illustrates a typical conversion from film to NTSC video.
Figure 2:
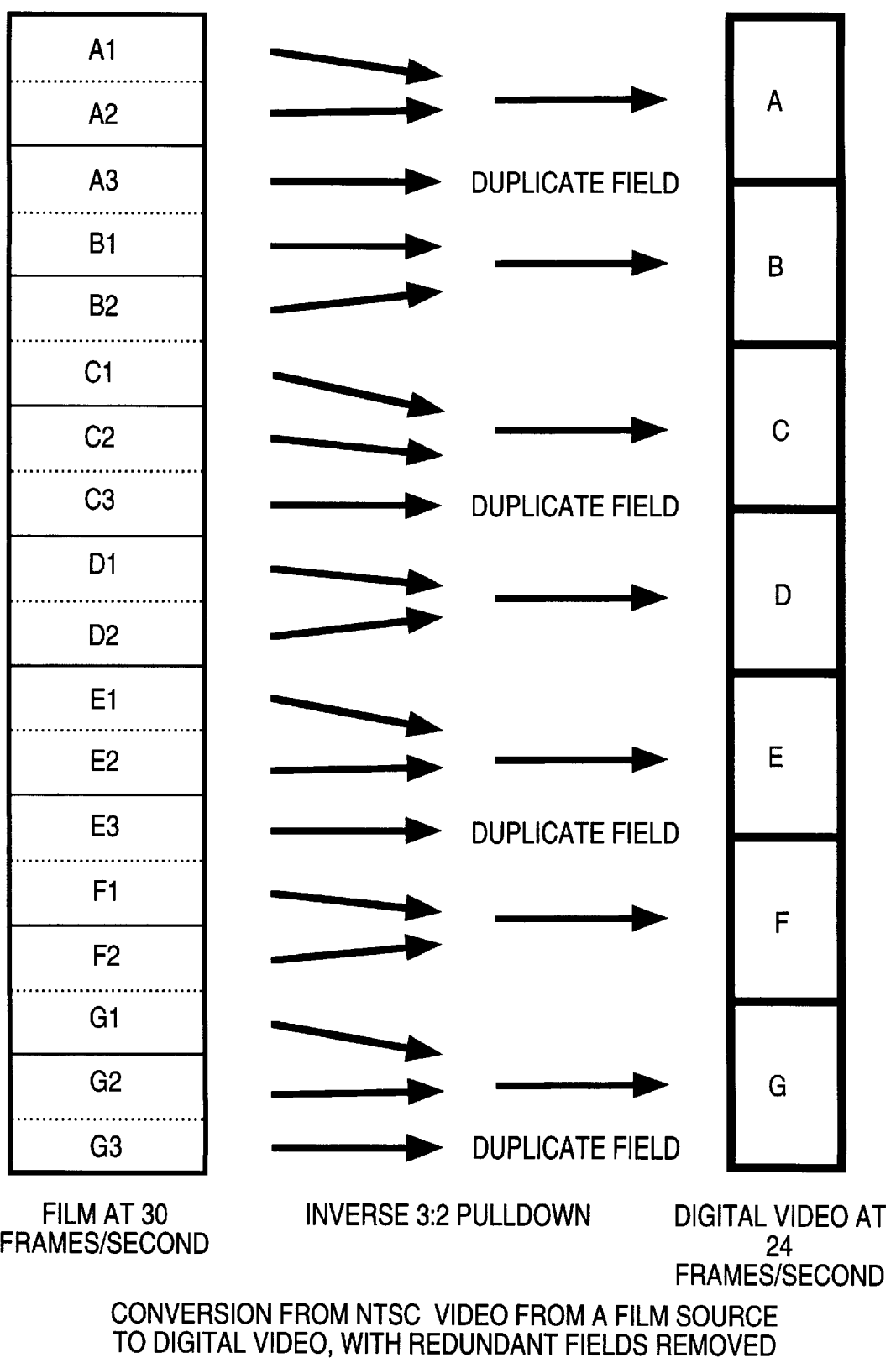
FIG. 2 illustrates a conversion of NTSC video from a film source to digital video, with redundant fields removed.
Figure 3:
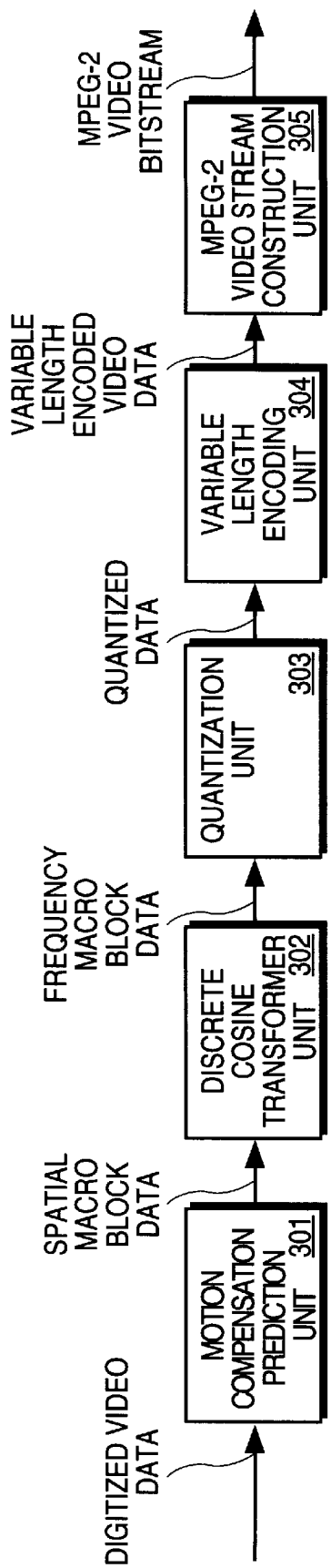
FIG. 3 illustrates in block diagram form the encoding process for MPEG video.

This encoding process is illustrated in block diagram form in FIG. 3. Video data is first streamed into Motion Compensation Prediction unit 301. The output of the Motion Compensation Prediction 301 unit is a spatial macroblock data. The spatial macroblock data is then processed by a discrete Cosine Transformer (DCT) unit 302. DCT unit 302 changes the information from a spatial domain to a frequency domain. The output of DCT 302 is a frequency macroblock data that is streamed into Quantization unit 303. Quantization unit 303 quantizes the data and the quantized data will then be processed by Variable Length Encoder unit 304. The output of Variable Length Encoder unit 304 is then processed by MPEG-2 Video Stream Construction Unit 305 and assembled into an MPEG-2 Video bitstream. More detailed information about MPEG-2 encoding can be found in the following documents:

1) ISO/IEC-11171-1- PART 1: SYSTEMS, INFORMATION FOR DIGITAL STORAGE
2) ISO/IEC-11171-2—PART 2: VIDEO, INFORMATION TECHNOLOGY—CODING OF MOVING PICTURES & ASSOCIATED AUDIO FOR DIGITAL STORAGE
3) ISO/IEC-11171-1—PART 3: AUDIO, INFORMATION TECHNOLOGY—CODING OF MOVING PICTURES & ASSOCIATED AUDIO FOR DIGITAL STORAGE
4) ISO/IEC-CD-11171—INFORMATION TECHNOLOGY—CODING OF MOVING PICTURES & ASSOCIATED AUDIO FOR DIGITAL STORAGE
5) ISO/IEC 13818-1, ITU-T H.222: SYSTEMS
6) ISO/IEC 13818-2, ITU-T H.262: VIDEO
7) ISO/IEC 13818-3: AUDIO

The present invention uses the motion vectors generated during the motion estimation process, to ascertain inverse frame rate conversion. The motion vectors are used to determine which of the video fields in the input to the conversion process are duplicates. To limit the compression time, the process is usually performed within a fixed 'search' range from the origin of the block in the original image. Each video image field within the fixed search range is segmented into a plurality of blocks. The plurality of blocks in each video image field is then compared to a plurality of blocks in adjacent video image fields within said fixed search range. The result of a particular block comparison is defined by the motion vector and a displacement error value that is the smallest error value within the search range. At set of motion vectors and displacement error values are calculated for each video field. The motion vectors and displacement error values are then correlated to determine if a video field is a duplicate video field. Duplicate video fields are associated with small motion vectors and small displacement errors. Finally, an inverse frame rate conversion is determined based on the presence of the duplicate video fields.

Figure 4A:
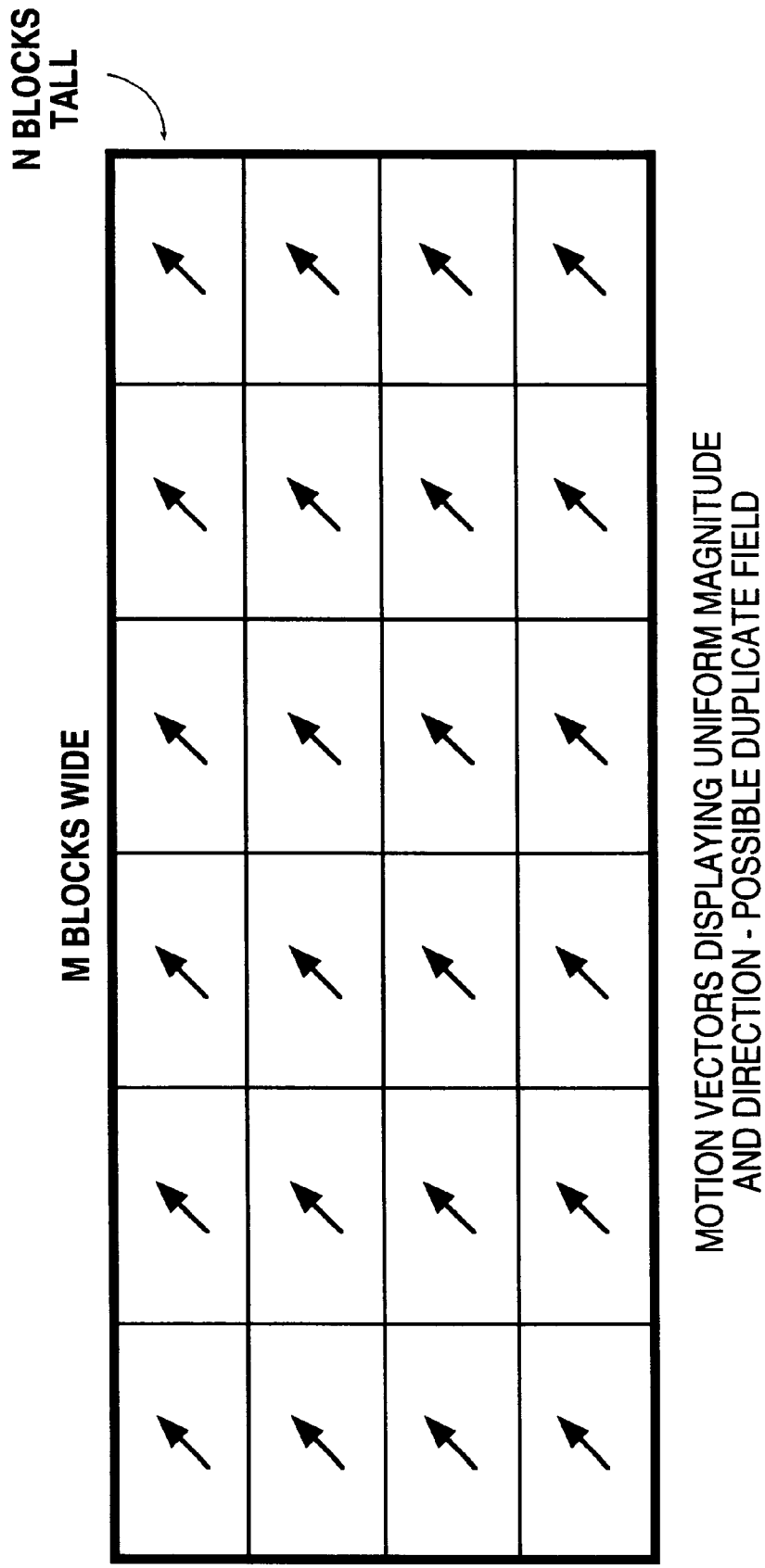
FIG. 4a illustrates motion vectors displaying uniform magnitude and direction, indicating a possible duplicate field.
Figure 4B:
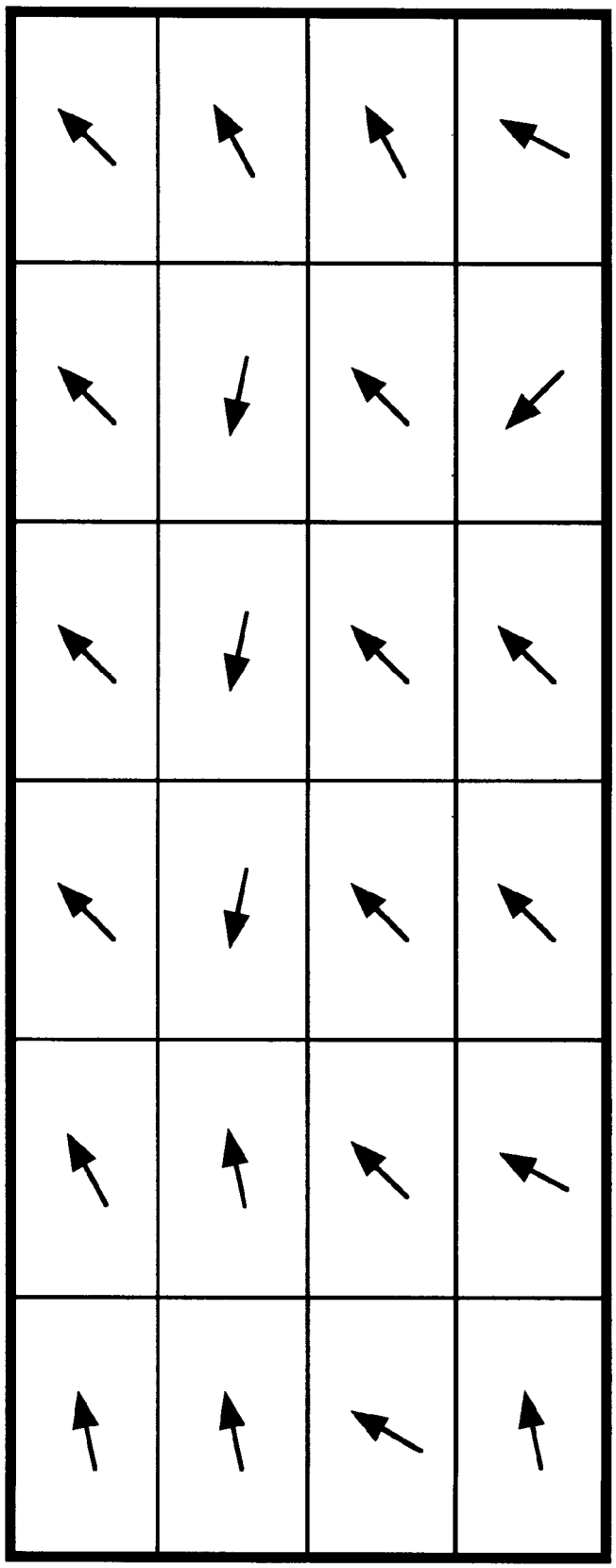
FIG. 4b illustrates motion vectors displaying non-uniform magnitude and direction, indicating a non-duplicate field.

In the preferred embodiment of the present invention, each block Bij (where $1<=i<=M$ and $1<=j<=N$) is compared to the adjacent field of the same type. The motion vectors Vxy (where x and y represent the displacement of the block in picture element or sub-picture element units) that have the smallest corresponding displacement error values are selected. For a particular field, a set of Vxy motion vectors and corresponding displacement error values will be obtained for each of the M×N blocks. The combination of these motion vectors and displacement error values represents the motion of each block in the field relative to an adjacent field of the same type. If the motion vectors for a particular pair of fields are highly correlated in magnitude, direction and sign, and the displacement error values are small, as shown in FIG. 4a, it indicates that the fields are very similar and a duplicate field is assumed. If the motion vectors are not correlated even with small displacement error values, as shown in FIG. 4b, or if the displacement error values are large although the motion vectors are correlated, it indicates that the two fields are not similar and are therefore not duplicates.

Figure 5B:
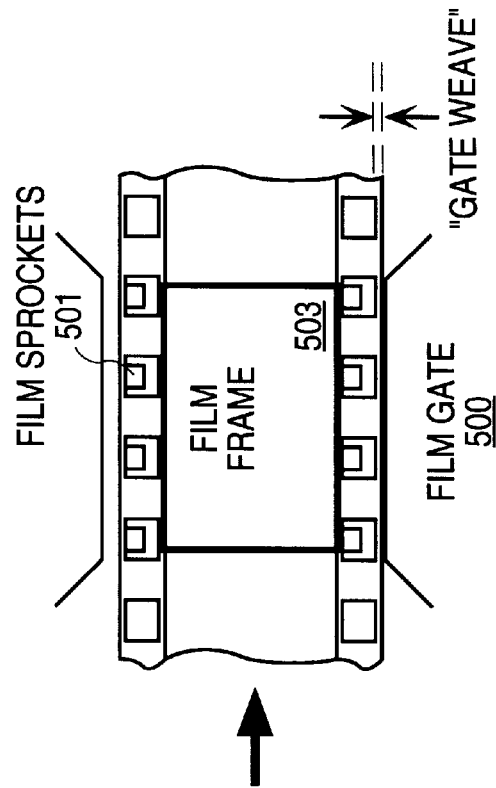
FIGS. 5a and 5b illustrate gate weaving during scanning.
Figure 5A:
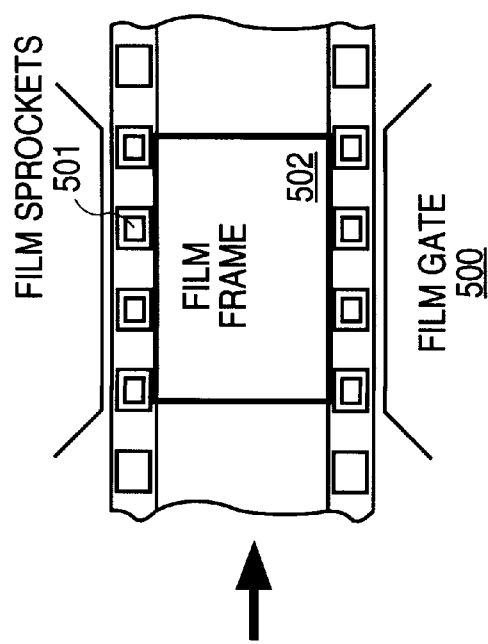

This use of motion estimation information in inverse 3:2 pulldown detection and generation allows for a certain amount of "gate weave" in case the video fields were scanned independently. "Gate weave" describes the movement of the film gate, film or video fields during scanning. Gate weaving during film gate scanning is illustrated in FIGS. 5a and 5b. In FIG. 5a, film gate sprockets 501 move Film Frame 502 to scan a first video field. If the film frame moves slightly, there is a possibility that the next video field may be displaced or "gate weaved" from the position of the first video field. The present invention takes into account such occurrences during the inverse 3:2 pulldown process by using a motion vector threshold value that is greater than the maximum gate weave possible. Thus, despite gate weaving, duplicate video fields will be detected during the inverse 3:2 pulldown.

The displacement error values generated during the inverse 3:2 pulldown process provide a concise representation for the comparison of the blocks of the field that can be compared with error values from other fields for correlation. Correlation among error values may suggest a change in lumination or shutter conditions when the two fields were scanned. Accumulated motion estimation information or more concise field difference information derived from the motion estimation information can be used to provide a recent history as to the 3:2 cycle detected. Video encoders already process video data for motion estimation at real-time speeds with a small delay. Since this method of 3:2 cycle determination uses the same motion estimation information as an encoder, a small delay may be necessary before the new 3:2 cycle is determined.

Figure 6:
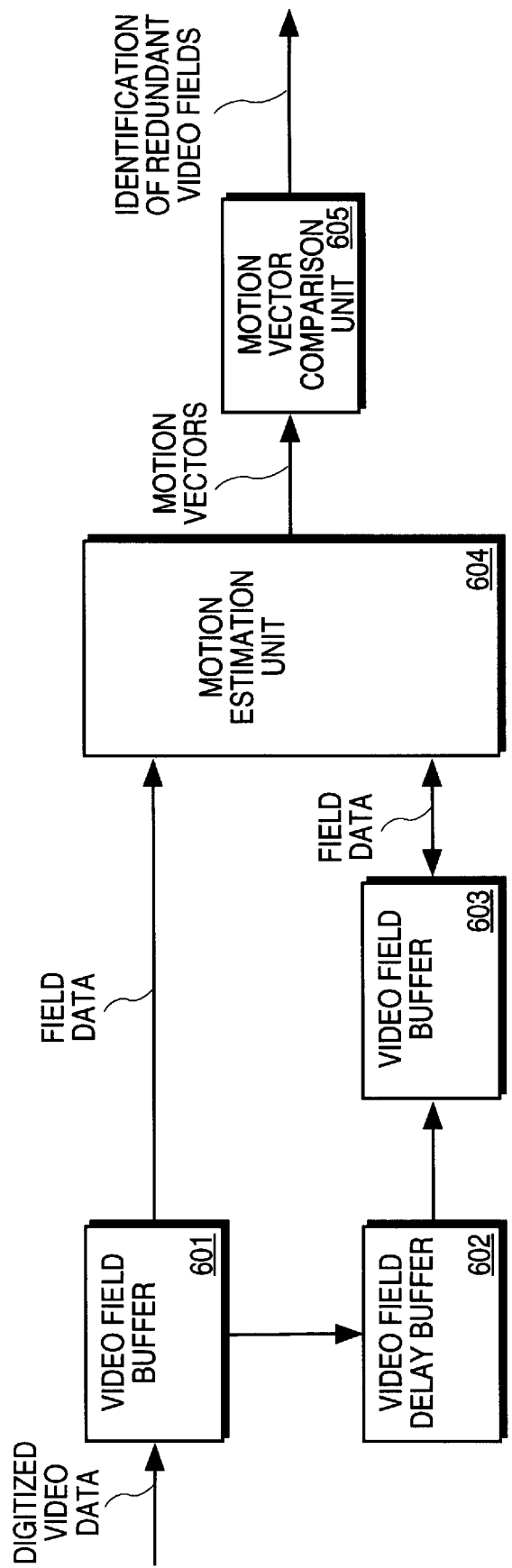
FIG. 6 illustrates in block diagram form the 3:2 pulldown process using motion estimation information.

A block diagram of an apparatus for performing inverse 3:2 pulldown process is illustrated in FIG. 6. Digitized video data is streamed into Video Field Buffer 601, Video Field Delay Buffer 602 and Video Field Buffer 603 consecutively. The video fields are temporarily buffered in Video Field Delay Buffer 602 between Video Field Buffer 601 and Video Field Buffer 603 such that Video Field Buffer 601 and Video Field Buffer 603 contain video fields of the same type, namely even or odd fields. The video fields in Video Field Buffer 601 and Video Field Buffer 603 are read by Motion Estimation Unit 604 to generate motion vectors. Motion Estimation Unit 604 generates motion vectors for the M×N blocks in each field. The generated motion vectors are output to Motion Vector Comparison Unit 605 to identify the inverse 3:2 pulldown pattern, thus identifying duplicate video fields. The process is repeated as the video field in Video Field Delay Buffer 602 is streamed into Video Field Buffer 603, and a video field of the same type is streamed into Video Field Buffer 601. The video field that was originally in Video Field Buffer 601 will now be temporarily stored in Video Field Delay Buffer 602, thus every other field is compared with each other. In this way, redundant video fields are determined for a stream of video data.

Figure 7:
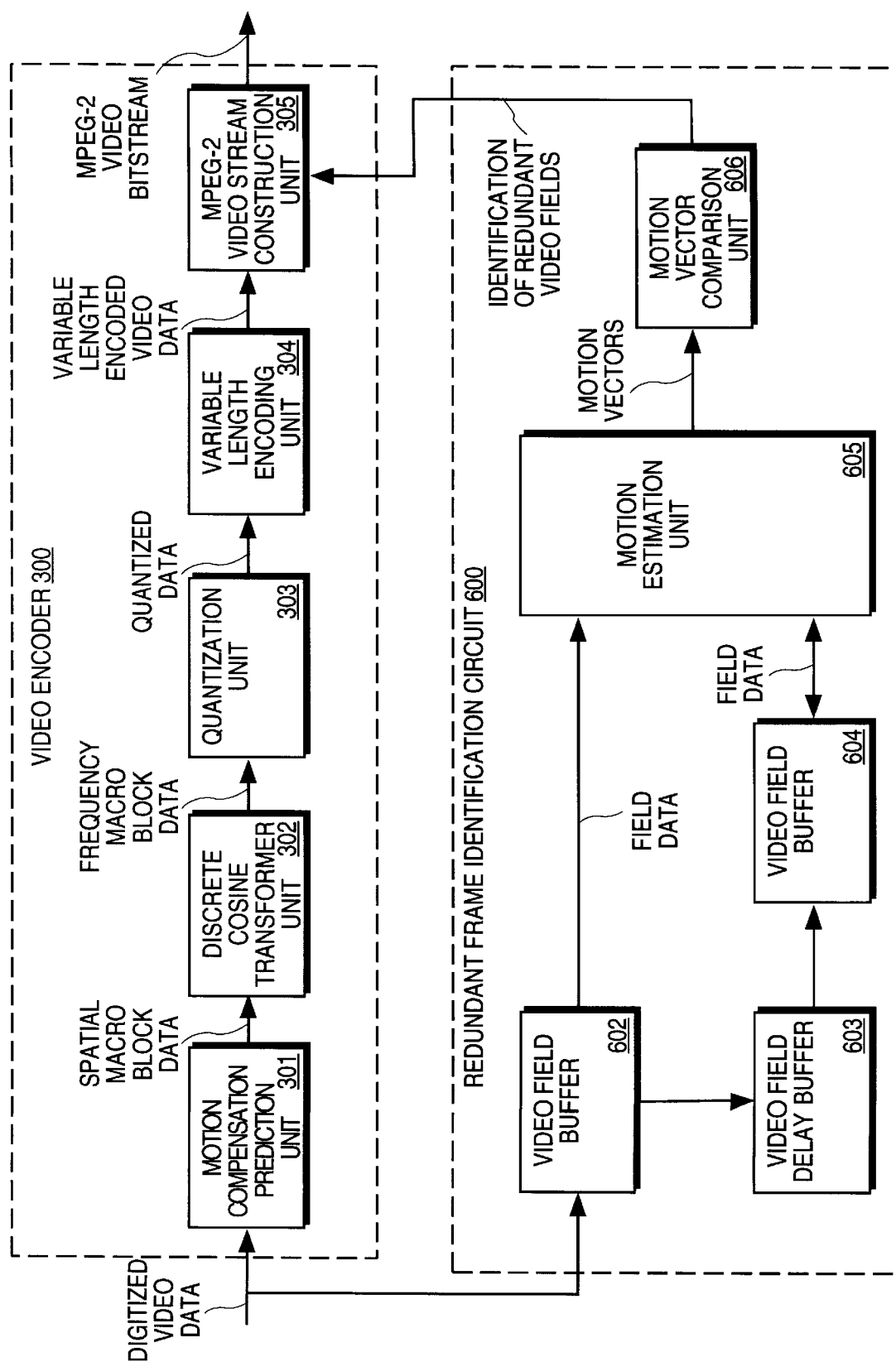
FIG. 7 illustrates in block diagram form the 3:2 pulldown process implemented within an MPEG-2 encoding system.

This inverse 3:2 pulldown process may be implemented in conjunction with an MPEG-2 encoding system as illustrated in FIG. 7. The Redundant Field Identification Circuit 600 receives the same digitized data that is input into Video Encoder 300. While the digitized data is processed through the MPEG-2 Video Encoder 300, it may also be processed by the Redundant Field Identification Circuit 600. As illustrated, the Redundant Field Identification Circuit 600 identifies redundant video fields. This information may be fed into the MPEG-2 Video Stream Construction Unit 305 that to creates the MPEG-2 video bitstream. Using the redundant video field information, the MPEG-2 Video Stream Construction Unit 305 can remove redundant video fields from the MPEG-2 video bitstream. In this way, the present invention enhances the performance of an MPEG-2 encoding system by allowing for more efficient compression.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for using motion estimation to determine inverse frame rate conversion by detecting duplicate video fields, said method comprising the steps of:
    segmenting each video image field within a fixed search range into a plurality of blocks;
    calculating a set of motion vectors for said plurality of blocks by comparing a first video field with a second video field;
    correlating said motion vectors to determine if said motion vectors are highly correlated in direction and magnitude; and
    testing said motion vectors to identify non-duplicate video fields based upon a combination of magnitude and correlation, said testing identifying said second video field as a non duplicate video field of said first video field if said motion vectors are not correlated in direction or said motion vectors are correlated in direction but have a large magnitude.

2. An apparatus for determining inverse frame rate conversion using motion estimation information, said apparatus comprising the elements of:
    a motion estimation unit, said motion estimation unit determining a set of displacement error values and a set of motion vectors by comparing a plurality of blocks in a current field with a temporally adjacent field; and
    a motion vector comparison unit, said motion vector comparison unit correlating said set of motion vectors to determine if said motion vectors are highly correlated in direction and magnitude, said motion vector comparison unit testing said motion vectors to identify non-duplicate video fields based upon a combination of magnitude and correlation, and said motion vector comparison unit determining that said current field is a non duplicate of said temporally adjacent field if said motion vectors are not correlated in direction or said motion vectors are correlated in direction but have a large magnitude.

3. The apparatus as disclosed in claim 2 wherein said motion vector comparison unit further uses a smallest displacement error value by comparing a displacement error value associated with each vector with a threshold value.

4. The apparatus of claim 2 further comprising:
    an inverse frame rate conversion unit, said inverse frame rate conversion unit determining an inverse frame rate based on said duplicate fields.

5. A method for using motion estimation to determine duplicate video fields, said method comprising:
    generating a set of motion vectors for a first video field by comparing a first plurality of blocks in said first video field with a temporally adjacent video field;
    comparing said set of motion vectors to determine if said motion vectors are highly correlated in direction and magnitude; and
    testing said motion vectors to identify non-duplicate video fields based upon a combination of magnitude and correlation, said testing determining that said first video field and said temporally adjacent video field are duplicate video fields if said motion vectors are not correlated in direction or said motion vectors are correlated in direction but have a large magnitude.

6. The method of claimed in claim 5 wherein said motion vectors are for a full set of blocks that comprise all of said first video field.

7. The method of claim 5 further comprising:
    removing one of said duplicate video fields.

8. A method of using motion estimation to determine inverse frame rate conversion, said method comprising:
    determining displacement error values and motion vectors by comparing a plurality of blocks in a current video field with a temporally adjacent video field;
    correlating magnitude and direction of said motion vectors; and
    testing said motion vectors to identify non-duplicate video fields based upon a combination of magnitude and correlation, said testing identifying determining that said current video field and said temporally adjacent video field are duplicate video fields if said motion vectors are not correlated in direction or said motion vectors are correlated in direction but have a large magnitude.

9. The method of claim 8 further comprising:
    removing one of said duplicate video fields.

10. The method as described in claim 8 wherein determining displacement error values comprises comparing said displacement error values with a threshold value.

* * * * *